US006438373B1

(12) United States Patent
Gulledge et al.

(10) Patent No.: US 6,438,373 B1
(45) Date of Patent: Aug. 20, 2002

(54) TIME SYNCHRONIZATION OF HUMAN SPEECH SAMPLES IN QUALITY ASSESSMENT SYSTEM FOR COMMUNICATIONS SYSTEM

(75) Inventors: Kenneth R. Gulledge, Hoover, AL (US); Edward Kryszkiewicz, Mount Prospect, IL (US); Henry Ward Anderson; Robert Andrew Grom, both of Palatine, IL (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/253,660

(22) Filed: Feb. 22, 1999

(51) Int. Cl.$^7$ .................................................. H04Q 7/20
(52) U.S. Cl. ...................... 455/423; 455/424; 455/67.1; 455/67.3; 704/228; 704/202
(58) Field of Search ................................. 455/422, 423, 455/67.1, 37.3, 115, 424; 704/200.1, 228, 231, 233, 202

(56) References Cited

U.S. PATENT DOCUMENTS

| | | | | |
|---|---|---|---|---|
| 4,352,182 A | * | 9/1982 | Billi et al. ...................... 371/22 |
| 5,490,240 A | | 2/1996 | Foran et al. ................. 395/130 |
| 5,644,623 A | | 7/1997 | Gulledge ..................... 455/423 |
| 5,684,921 A | * | 11/1997 | Bayya et al. ............... 395/2.35 |
| 5,715,372 A | * | 2/1998 | Meyers et al. ................ 395/21 |
| 5,864,794 A | * | 1/1999 | Tasaki ........................ 704/214 |
| 5,867,813 A | * | 2/1999 | Di Pietro et al. ........... 704/202 |
| 5,890,104 A | * | 3/1999 | Hollier ........................ 704/201 |
| 5,987,320 A | * | 11/1999 | Bobick ........................ 455/423 |
| 6,035,270 A | * | 3/2000 | Hollier et al. ............... 704/202 |

OTHER PUBLICATIONS

*The Bell System Technical Journal*, Jan. 1979.
Specification EIA IS–3B entitled "Cellular System Mobile Station—Land Station Compatibility Specification", Jul. 1984, Electronic Industries Association.
Wang, S. et al., "An Objective Measure for Predicting Subjective Quality of Speech Coders," *IEEE J. on Selected Areas in Commun.*, 1992, 10(5), 819–829.

* cited by examiner

*Primary Examiner*—Dwayne Bost
*Assistant Examiner*—Joy Contee

(57) ABSTRACT

A system and method are disclosed for determining a level of quality of a communications medium having an indeterminate delay. The communications medium communicatively couples a transmitting station and a receiving station. The transmitting station transmits over the communications medium a measurement sequence including a synchronization sequence followed by a measurement sample. The transmitted measurement sample has a predetermined beginning point, which is identified by the transmitted synchronization sequence. The receiving station receives over the communications medium the measurement sequence including the synchronization sequence followed by the measurement sample. The receiving station determines from the received synchronization sequence the beginning point of the received measurement sample. The transmitted measurement sample and the received measurement sample are then compared according to respective beginning points to determine the level of quality of the communications medium.

29 Claims, 5 Drawing Sheets

| Step | Receiving Station Action | Transmitting Station Action |
|---|---|---|
| 1 | Initiate Synchronization sequence by sending an 1800-Hertz tone. Transition to step 2 while continuing to transmit the 1800-Hertz tone | Listen for 1800 Hz tone. When 1800 tone detected transition to step 2 |
| 2 | Listen for 1000-Hertz tone. When a 1000-Hertz tone is detected stop sending the 1800-Hertz tone and transition to step 3 | Transmit Synchronization Sequence, which consists of 400 Milliseconds of 1000-Hertz tone, eight milliseconds of 1000-Hertz tone containing a 180-degree phase shift, followed by 200 milliseconds of 1000-Hertz tone. When sequence is complete transition to step 5 |
| 3 | Clip 1000-Hertz tone to a square wave. Correlate resulting signal to the correlation pattern. | |
| 4 | If correlation is successful wait exactly 200 milliseconds from successful correlation point and then transition to step 5. If correlation is not successful transition to step 1. | |
| 5 | Receive human speech sample and produce BSD measurement. When the human speech sample reception is complete transition to step 6 | Transmit human speech sample while also listening for an 1800-Hz tone. If an 1800-Hz tone is detected during the transmission of the human speech sample transition to step 2. If the human speech sample is completed without detecting an 1800-hz tone proceed to step 6 |
| 6 | Exchange role to become a transmitting station and transition to transmitting station step 1 | Exchange role to become a receiving station and transition to receiving station step 1 |

FIG. 8

TIME SYNCHRONIZATION OF HUMAN SPEECH SAMPLES IN QUALITY ASSESSMENT SYSTEM FOR COMMUNICATIONS SYSTEM

FIELD OF THE INVENTION

The present invention relates to a communications system such as a cellular radiotelephone communications system. More specifically, the present invention relates to a method and apparatus for providing automated assessment of the quality of service provided by such communications system.

BACKGROUND OF THE INVENTION

The structure and operation of a typical communications system such as a cellular radiotelephone communications system is known. For example, the structure and operation of a cellular radiotelephone system has been disclosed in publications such as the January 1979 issue of The Bell Systems Technical Journal, and Specification EIA IS-3B entitled "Cellular System Mobile Station—Land Station Compatibility Specification" July, 1984, Electronic Industries Association, both hereby incorporated by reference.

In connection with such cellular radiotelephone communications system in particular, it is known that audio quality analyzers can be employed to measure and report quality information of audio communication channels. Such quality information is used to ensure a high level of quality of cellular service over the service provider's coverage area. In newer digital cellular radiotelephone systems, however, such audio quality information is not adequate to assess the quality of service provided by such digital systems.

Specifically, the audio quality measurement techniques utilized by such audio quality analyzers use continuous audio tones to measure the quality of the audio communication channel. However, digital cellular radiotelephone systems employ digital voice coders which are designed to efficiently encode and decode human speech, and which actually distort continuous tones. As should be understood, such distorted continuous tones cause measurements of audio quality that are much lower than expected. Accordingly, such distortion renders continuous tone techniques useless when characterizing the quality of service provided by digital radiotelephone systems.

Several techniques to measure the quality of the speech transferred through digital radiotelephone coders have been developed. See, for example, S. Wang, A. Sekey, A. Gersho, "An Objective Measure for Predicting Subjective Quality of Speech Coders," IEEE Journal on Selected Areas in Communications, vol. 10, no. 5, June 1992, pp. 819–829, hereby incorporated by reference. Briefly, such digital techniques employ samples of human speech to measure the quality of a digital communication channel. Doing so overcomes the distortion problems in digital cellular radiotelephone systems caused by the continuous tone techniques and is also appropriate for measuring the quality of service provided by analog cellular radiotelephone systems. However, and importantly, the human speech sample techniques require exact timing and have been designed for use in a laboratory environment where such exact timing can be closely controlled.

As should be evident, though, a cellular radiotelephone service provider needs to ascertain whether high quality analog and digital service is being provided to all areas where the cellular radiotelephone system provides service, not just in the laboratory environment. Accordingly, a need exists for a method and apparatus for providing automated, in field, geographically located measurements of cellular radiotelephone audio quality employing human speech samples to either verify high quality cellular coverage is present in each area or to identify problem areas which need correction. Moreover, a need exists for such a method and apparatus wherein the measurement of cellular radiotelephone system quality is repeatable between days, weeks, months and even years of testing for statistical accuracy.

SUMMARY OF THE INVENTION

The aforementioned needs are satisfied by a system and method for determining a level of quality of a communications medium having an indeterminate delay. The communications medium communicatively couples a transmitting station and a receiving station. The transmitting station transmits over the communications medium a measurement sequence including a synchronization sequence followed by a measurement sample. The transmitted measurement sample has a predetermined beginning point, which is identified by the transmitted synchronization sequence.

The receiving station receives over the communications medium the measurement sequence including the synchronization sequence followed by the measurement sample. The receiving station determines from the received synchronization sequence the beginning point of the received measurement sample. The transmitted measurement sample and the received measurement sample are then compared according to respective beginning points to determine the level of quality of the communications medium.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 8 is a flow diagram showing the steps performed by the assessment system of FIG. 1 during a retry.

DETAILED DESCRIPTION OF PREFERRED EMBODIMENTS

Figure 1:
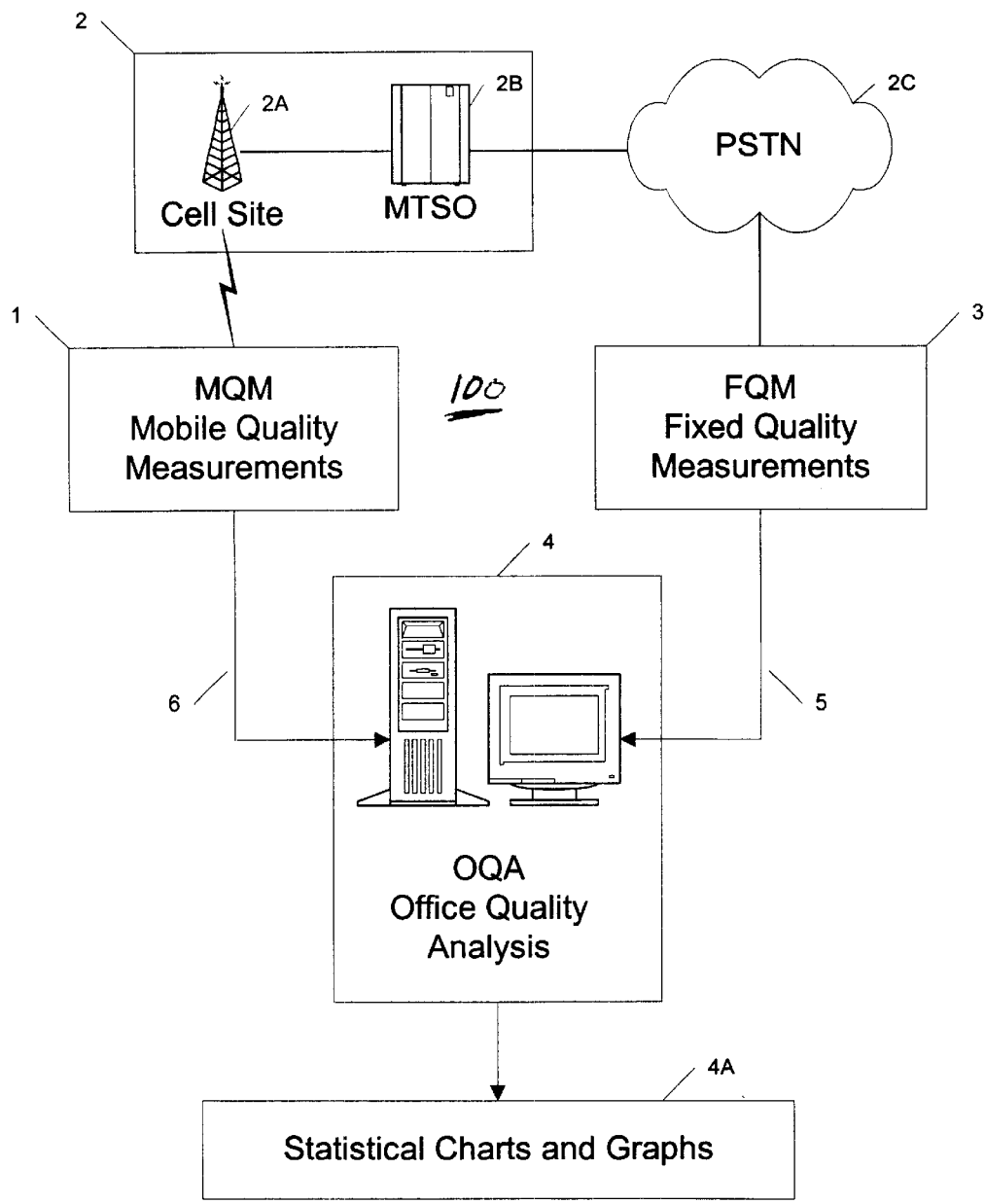
FIG. 1 is a block diagram illustrating an automated quality assessment system for a cellular radiotelephone system in accordance with one embodiment of the present invention.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

Referring to the drawings in detail, wherein like numerals are used to indicate like elements throughout, there is shown in FIG. 1 an automated quality assessment system (AQAS) 100 for a communications system such as a cellular radiotelephone system, digital or analog. Of course, such assessment system 100 may be used for other communications systems without departing from the spirit and scope of the present invention. As but one example, such assessment system 100 may be used with a land-line based system, digital or analog. The assessment system 100 is similar to and an enhancement of the system disclosed in U.S. Pat. No. 5,490,204, issued to Gulledge (the inventor of the present disclosure) on Feb. 6, 1996, hereby incorporated by reference.

As seen in FIG. 1, the assessment system 100 includes a mobile quality measurement sub-system MQM 1, a fixed quality measurement sub-system FQM 3, and an office quality analysis sub-system OQA 4. As should be understood, the MQM 1 contains, monitors and controls one or more cellular radiotelephone mobile stations. Likewise, the FQM 3 provides service as one or more fixed telephone stations and is attached to a public switched telephone network PSTN 2C, which connects to a mobile telephone switching office MTSO 2B. Cellular radiotelephone calls are placed between MQM 1 and FQM 3 through a cellular radiotelephone system infrastructure 2 which includes the MTSO 2B and one or more cell sites 2A.

In operation, the system 100 causes data to be collected by the MQM 1 and the FQM 3 specific to the progress and audio quality obtained by each cellular radiotelephone call placed. At the conclusion of a test, the collected data is transferred from the FQM 3 and the MQM 1 to the OQA 4 through respective data paths 5, 6. The data paths 5, 6 may be any data paths without departing from the spirit and scope of the present invention. For example, each data path 5, 6, can be a hand-carried storage device such as a floppy disk or the like, a data line, a phone line, a network interface or any other type of appropriate data path. In one embodiment of the present invention, data collected by the FQM 3 is returned to the MQM 1 and transferred to the OQA 4 through data path 6.

Preferably, the OQA 4 matches the data collected by the MQM 1 and the FQM 3 based on the time of day of the collection to produce statistical tables and graphs 4A that represent the quality of the cellular service provided during the test. Many sets of test data collected throughout the coverage area of a cellular radiotelephone system may be combined to form a comprehensive view of the quality of service provided by the cellular radiotelephone system being assessed.

Preferably, the MQM 1 and FQM 3 each contain a Digital Signal Processor (DSP) 17 (FIG. 7) or other computer or processor, as well as appropriate memory and other supporting peripherals. The DSP 17 or other computer or processor, as well as the memory and other supporting peripherals, may each be any appropriate device without departing from the spirit and scope of the present invention, as long as each element has sufficient capabilities for performing the functions required in a timely manner. In the present invention, after each cellular radiotelephone call is placed or received, the DSP 17 in each sub-system 1, 3 sends a human speech sample to determine the audio quality of the communication channel provided by the cellular radio telephone infrastructure 2. The human speech sample as received is then compared with a reference human speech sample which is stored locally. The comparison results in a measure of distortion known as Bark Spectral Distortion (BSD), and is more fully disclosed in the aforementioned S. Wang, A. Sekey, A. Gersho, "An Objective Measure for Predicting Subjective Quality of Speech Coders".

BSD comparison measurement requires close time alignment between the beginning of the distorted human voice sample that has been transmitted and the beginning of the reference human voice sample. In a laboratory environment, such comparison measurement is a relatively simple matter to accomplish because the exact time when the sample is transmitted and received is known and easily controlled. Within an operating cellular radiotelephone system, however, there exist many dynamic factors that can cause delays between when the speech sample is transmitted and received, making the comparison difficult if not impossible. Importantly, timing errors greater that one millisecond can cause large negative errors in the measurement of the quality of the communication channel, thus producing erroneously poor voice quality measurements.

In the present invention, then, the laboratory-based measurement technique utilizing human speech samples is enhanced with embedded timing information to provide timing accuracy better than one millisecond. In particular, in the present invention, a synchronization sequence is transmitted before the human speech sample. Such synchronization sequence allows the receiving station to accurately determine the beginning of the received human speech sample and also accommodates for the varying delays within the communication channels of an operating cellular radiotelephone network, thus allowing accurate BSD measurements.

Measurement Sequence

BSD measurements are made according to a measurement sequence. Referring to FIG. 1, in a cellular radiotelephone system, measurement sequences are initialized after a cellular radiotelephone call is made from the MQM 1 to the FQM 3. It should be understood, though, that a call may also be placed from the FQM 3 to MQM 1, from a first MQM 1 to a second MQM 1, or from a first FQM 3 to a second FQM 3, all without departing from the spirit and scope of the present invention.

Assuming now that the call is made from the MQM 1 to the FQM 3, the MQM 1 begins the first measurement sequence operating as a receiving station with the FQM 3 operating as a transmitting station. During the second sequence, the MQM 1 operates as a transmitting station and the FQM 3 operates as a receiving station. The measurement sequences continue in this alternating fashion for the duration of the cellular phone call. The duration of each call, and the periodicity of calls, is specified by the user of the AQAS assessment system 100.

Figure 2:
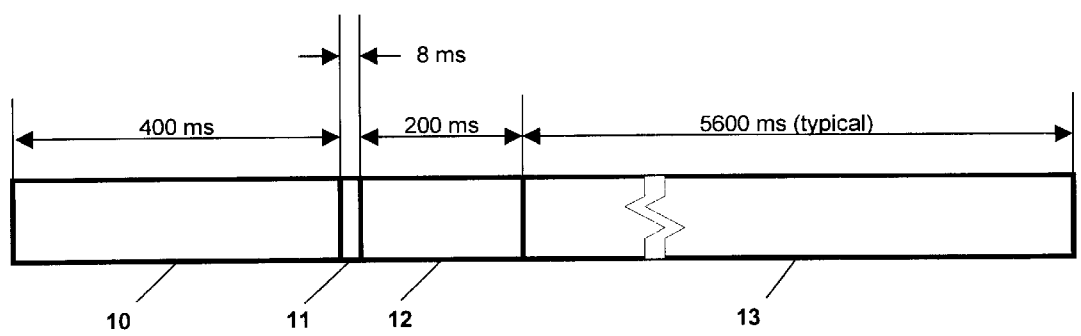
FIG. 2 is a timing diagram not to scale showing a measurement synchronization sequence employed by the assessment system of FIG. 1.

Referring now to FIG. 2, the measurement sequence is shown. As seen, the measurement sequence consists of two main parts: the synchronization sequence (elements 10, 11, and 12) and the human speech sample (element 13). In particular, in one embodiment of the present invention, the synchronization sequence includes, in serial fashion, a 400-millisecond 1000-hertz tone (element 10), followed by an 8-millisecond 1000-hertz tone containing a single 180-degree phase shift (element 11), followed by a 200- millisecond 1000-hertz tone (element 12). The synchronization sequence 10, 11, 12, is then followed by a human speech sample 13, which in one embodiment of the present invention is 5600 milliseconds in duration. Together elements 10, 11, 12, and 13 comprise the measurement sequence and are sent from the transmitting station to the receiving station. Of course, it will be recognized that different time values and frequency values may be employed in the measurement sequence 10, 11, 12, 13 without departing from the spirit and scope of the present invention. Likewise, it will be recognized that different sequence components and combinations of sequence components may also be employed in the measurement sequence 10, 11, 12, 13 without departing from the spirit and scope of the present invention.

Synchronization Sequence

Assuming that the measurement sequence 10, 11, 12, 13 is as described above and shown in FIG. 2, it is to be understood that the synchronization sub-sequence of the measurement sequence takes place in connection with the 8-millisecond 1000-hertz tone containing a single 180-degree phase shift (element 11). More specifically, and referring now to FIG. 3., a portion of the synchronization sequence of FIG. 2 is shown. Such portion includes the last 12 cycles of the 400-millisecond 1000-hertz tone 10, the entire 8-millisecond 1000-hertz tone containing a single 180-degree phase shift 11, and the first 12 cycles of the 200-millisecond 1000-hertz tone 12. As seen, the transition between each tone 10, 11, 12 is smooth and continuous.

The 400-millisecond 1000-hertz tone 10 and the 200-millisecond 1000-hertz tone 12 are 180 degrees out of phase with each other due to the 180-degree phase shift within the 8-millisecond 1000-hertz tone containing a single 180-degree phase shift 11. The 400 millisecond duration of the 400-millisecond 1000-hertz tone 10 allows a digital voice coder utilized in a typical digital cellular radiotelephone system to settle into a steady state, thereby reducing distortion of the 8-millisecond 1000-hertz tone containing a single 180-degree phase shift 11. The entire synchronization sequence 10, 11, 12 is transmitted from the transmitting station to the receiving station as a preamble to the human speech sample 13. The start of the human speech sample 13 is exactly 200 milliseconds from the end of the 8 milliseconds of 1000-hertz tone containing a single 180-degree phase shift 11.

Distortion Reduction

Figure 3:
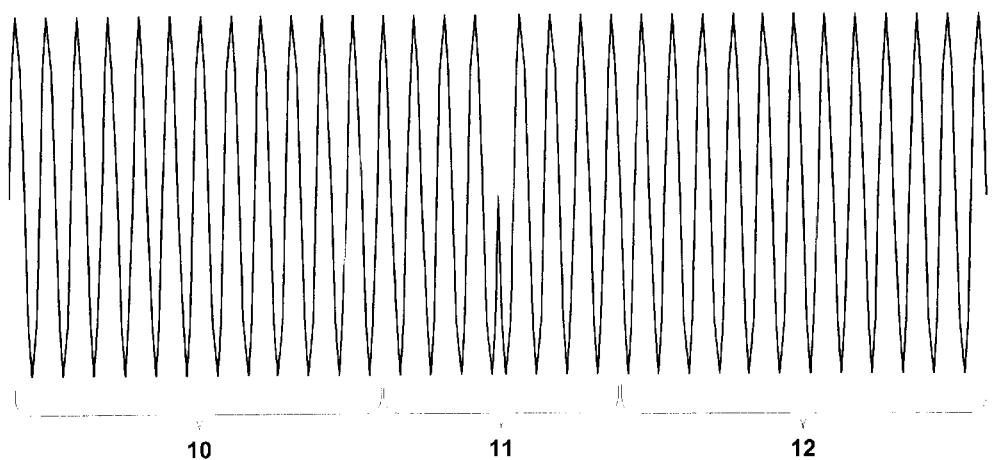
FIG. 3 is an enhanced view of a portion of the measurement synchronization sequence of FIG. 2.
Figure 4:
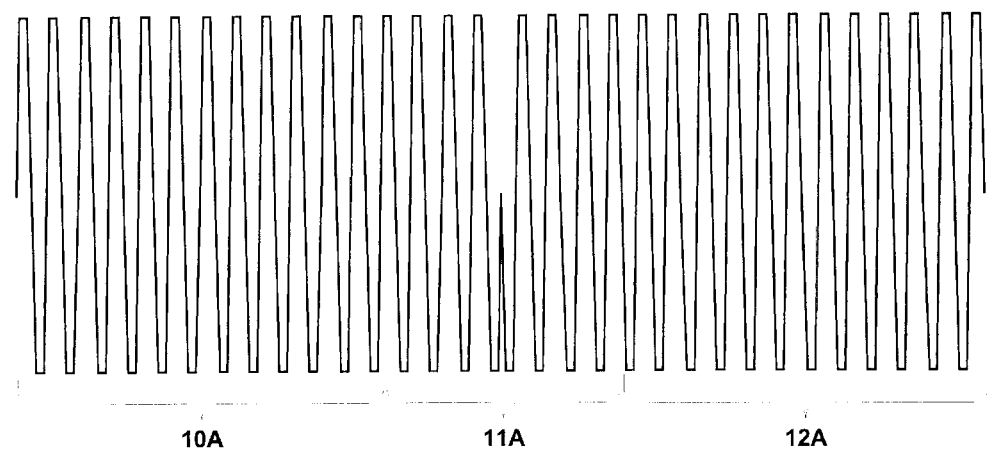
FIG. 4 is a timing diagram corresponding to FIG. 3, and shows the portion of the measurement synchronization sequence of FIG. 3 after distortion reduction.

As the receiving station receives the synchronization sequence 10, 11, 12 from the transmitting station, the sinusoidal waveform embodied therein is clipped into a square waveform, as can be seen in FIG. 4, which corresponds temporally to FIG. 3, with element numbers 10, 11, and 12 corresponding to element numbers 10A, 11A, and 12A, respectively. The clipping process, as is known, reduces the distortion of the sinusoidal waveform introduced by the aforementioned digital voice coder. Importantly, the clipping process does not affect performance in an analog cellular radiotelephone system where distortion of a sinusoidal waveform is not a problem.

Correlation

Figure 5:
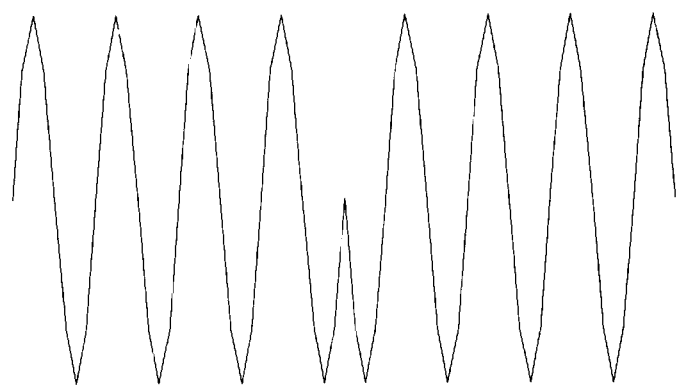
FIG. 5 is an enhanced view of a sub-portion of the measurement synchronization sequence of FIG. 3.

A receiving station called by a transmitting station begins a measurement sequence by listening for a 1000-hertz tone from the transmitting station. When 50 milliseconds of continuous 1000-hertz tone is detected, the receiving station begins a correlation process whereby such receiving station listens to the synchronization sub-sequence of the measurement sequence and attempts to detect a portion of the synchronization sub-sequence that corresponds to a correlation pattern 14 (FIG. 5). As should now be understood, and as seen in FIG. 5, the correlation pattern 14 is substantially identical to the 8-millisecond 1000-hertz tone containing a single 180-degree phase shift 11 shown in FIGS. 2–4.

Figure 7:
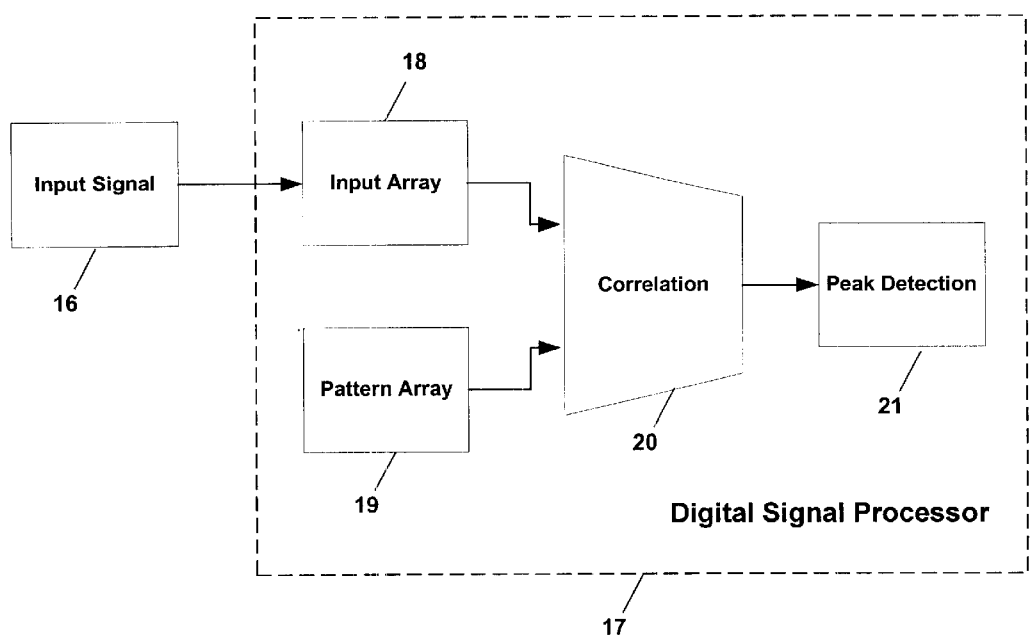
FIG. 7 is a block diagram illustrating the correlation process performed by the assessment system of FIG. 1.

In particular, in one embodiment of the present invention, the DSP 17 of the receiving station (either MQM 1 or FQM 3 of FIG. 1) samples the synchronization sequence at 8000 hertz as such sequence is received by the receiving station. Referring now to FIG. 7, during the correlation process, the DSP 17 of the receiving station places each sample in a sixty-four-element input array 18 that has been initialized to zero before the process begins. The DSP 17 also has the correlation pattern 14 of FIG. 5. digitally stored in a sixty-four-element pattern array 19. As each sample of the synchronization sequence is received and placed in the input array 18, a correlation block 20 in the DSP 17 multiplies each element of the input array 18 with the corresponding element in the pattern array 19, squares the result of each multiplication, and then adds together all 64 terms to result in the correlation output. Put mathematically, the correlation block 20 performs the following function on each sample:

$$CorrelationOutput = \sum_{i=1}^{64} (InputArray_i * PatternArray_i)^2$$

Figure 6:
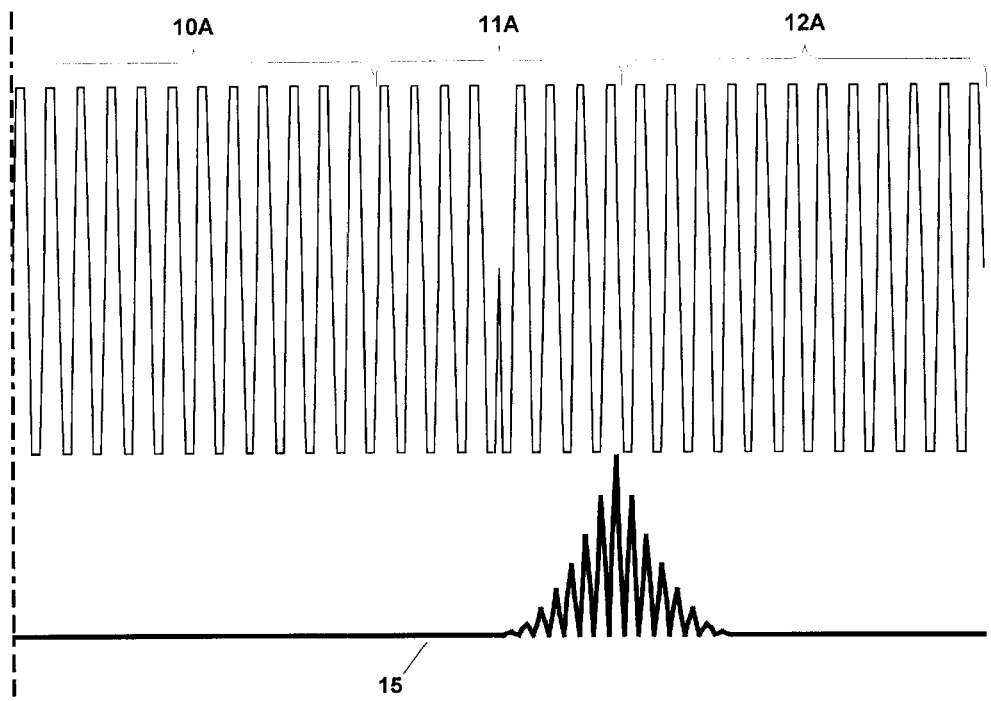
FIG. 6 is a timing diagram and shows correlation output based on the distortion reduced measurement synchronization sequence of FIG. 4 as correlation input.

Referring now to FIG. 6, the portion of the synchronization sequence 10A, 11A, 12A shown in FIG. 4 along with the correlation output 15 that is computed by the correlation block 20 based on such synchronization sequence 10A, 11A, 12A. As seen in FIG. 6, the correlation output 15 peaks at the point in the synchronization sequence where the digital pattern in the input array 18 closely matches the digital pattern in the pattern array 19. Accordingly, the peak of such correlation output 15 is used as a timing mark to indicate to the receiving station that the human speech sample follows exactly 200 milliseconds later in time.

Correlation Peak Detection

Extracting the exact time of the correlation output 15 peak is performed by the peak detection block 21 of the DSP 17 (FIG. 7), and requires that the correlation process is running before the start of the 8-millisecond 1000-hertz tone containing a single 180-degree phase shift 11. In one embodiment of the present invention, and as was discussed above, the DSP 17 of the receiving station starts the correlation process after 50 milliseconds of continuous 1000 tone hertz tone has been detected. The correlation process may then be ended 400 milliseconds later, although greater or lesser durations may be employed without departing from the spirit and scope of the present invention.

Preferably, during the 400-millisecond duration that the correlation process is running, the peak detector 21 of the DSP 17 (FIG. 7) remembers the largest value produced by the correlation block 20 and the exact time when such largest value was produced. At the completion of the correlation process, then, the difference in time between when the correlation process ended and when the largest correlation value was produced is subtracted from 200 milliseconds. The resulting difference is the exact time needed to wait before the start time of the human speech sample, and the DSP 17 may then synchronize the receiving station to such start time. In one embodiment of the present invention, the receiving station sets a count-down timer (not shown) to count down the time until such start time, and begins BSD measurements upon the expiration of such timer. Of course, it will be recognized that other particular synchronization methods based on a detected peak from a correlation process may be employed without departing from the spirit and scope of the present invention.

Preferably, the maximum output from the correlation block 20 must exceed a threshold for the peak detector 21 to consider the correlation process successful. For example, if 1.0 is a perfect correlation value, a value of about 0.3–0.4 may be employed as the threshold for successful correlation. In one embodiment of the present invention, a value of about 0.375 is employed. Of course, the threshold can be higher or lower without departing from the spirit and scope of the present invention, although it is to be understood that a higher threshold may be too restrictive, and a lower threshold may not be restrictive enough.

It is to be noted that the relatively simple single phase shift correlation pattern 14/tone 11 disclosed herein results in a relatively low yet acceptable typical correlation value (i.e., greater than the threshold) in the present invention. A higher typical correlation value could instead be obtained if the correlation pattern 14/tone 11 was more complicated. For example, such a more complicated correlation pattern 14/tone 11 could be a 'chirp', i.e., a tone that transitions from a low frequency to a high frequency relatively quickly. Nevertheless, the relatively simple single phase shift correlation pattern 14/tone 11 used in the present invention is still preferred, since such relatively simple single phase shift correlation pattern 14/tone 11 passes through the various digital coders employed in a typical digital radiotelephone system with little distortion. Conversely, a chirp pattern passed through the various digital coders is highly distorted.

Fault Tolerance

Of course, unsuccessful correlation can be expected in any network, including an operating digital radiotelephone network. Temporary impairments within the communication channel provided by the network can and do cause the correlation process to fail. A retry mechanism is therefore utilized to overcome a failure to achieve correlation success. In one embodiment of the present invention, and as shown in FIG. 8, the retry mechanism comprises the following:

After the 400-millisecond duration that the correlation process is run, if the peak detection block fails to detect a correlation value greater than the minimum correlation threshold, the receiving station emits an 1800-hertz handshake tone, and the transmitting station listens for the 1800-hertz handshake tone (step 1). Once the 1800-hertz handshake tone is detected, the transmitting station then re-transmits the entire synchronization sequence 10, 11, 12 of FIG. 2, and the receiving station, upon detecting the 1000-hertz tone which begins the synchronization sequence, stops transmitting the 1800-hertz tone (step 2). Thereafter, the receiving station clips the 1000-hertz tone and runs the correlation process via the DSP 17, the arrays 18, 19, the correlation block 20, and the peak detection block 21 of FIG. 7 for 400 milliseconds (as before) (step 3). Once more, the peak detector block 21 tests for successful correlation (step 4). If the correlation is not successful the receiving station transitions to step 1. Assuming, though, that the correlation is now successful, the receiving station becomes synchronized to the start time of the human speech sample as transmitted by the transmitting station (step 5). The retry mechanism as discussed herein is repeated until successful correlation is achieved. Alternatively, a fixed number of retry attempts are tried.

During step 5, the transmitting station listens for an 1800-hertz tone from the receiving station while transmitting the human voice sample, just as such transmitting station does in step 1. In the case that such 1800-hertz tone is detected by the transmitting station while the human speech sample is being transmitted, then, the transmitting station transitions to step 2 to handle the correlation failure by the receiving station. Assuming, however, that no correlation failure occurs, and that the transmitted human voice sample has been received successfully, the receiving station and the transmitting station then exchange operating roles.

As should now be understood, the 1800-hertz retry tone may also be employed as an initialization tone by the receiving station to indicate to the transmitting station that such receiving station is ready to receive. Accordingly, when the receiving station and the transmitting station exchange operating roles, both stations may transition (in their new roles) to step 1.

CONCLUSION

The programming necessary to effectuate the processes performed in connection with the present invention is relatively rudimentary and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system and method for time synchronization of human speech samples in a quality assessment system for a communications system. Importantly, the system and method take into account the fact that timing variations can be expected in an operating cellular network, based on differing communications paths and differing transmission-reception delays. By attaching timing synchronization information directly with the human speech sample, the present invention allows the production of accurate BSD measurements despite the differing delays. It should be appreciated that changes could be made to the embodiments described above without departing from the inventive concepts thereof. As but a few examples, each array 18, 19 may have a number of elements other than 64, and the handshake tone may be at a frequency other than 1800 hertz. It should be understood, therefore, that this invention is not limited to the particular embodiments disclosed, but it is intended to cover modifications within the spirit and scope of the present invention as defined by the appended claims.

What is claimed is:

1. A method for determining a level of quality of a communications medium having an indeterminate delay, the communications medium communicatively coupling a transmitting station and a receiving station, the method comprising the steps of:

transmitting from the transmitting station over the communications medium a measurement sequence including a synchronization sequence followed by a measurement sample, the transmitted measurement sample having a predetermined beginning point, the transmitted synchronization sequence identifying the beginning point of the transmitted measurement sequence;

receiving by the receiving station over the communications medium the measurement sequence including the synchronization sequence followed by the measurement sample;

clipping the received measurement sequence including the received synchronization sequence followed bV the received measurement sample, wherein the clipping removes distortion;

determining by the receiving station from the received synchronization sequence the beginning point of the received measurement sample; and comparing the transmitted measurement sample and the received measurement sample according to the respective beginning points to determine the level of quality of the communications medium.

2. The method of claim 1 wherein the transmitting step comprises transmitting from the transmitting station over the communication medium a measurement sequence including a synchronization sequence followed by a measurement sample having a human speech sample.

3. The method of claim 1 wherein the transmitting step comprises transmitting from a digital radiotelephone over a digital radiotelephone communications medium.

4. The method of claim 1 wherein the transmitting step comprises transmitting from the transmitting station a synchronization sequence including, in serial fashion, an attention portion to obtain the attention of the receiving station, followed by a marker portion marking the beginning of a fixed-length delay portion, followed by the fixed-length delay portion, the end of the fixed-length delay portion being the beginning point of the transmitted measurement sample.

5. The method of claim 4 wherein the transmitting step comprises transmitting from the transmitting station a synchronization sequence includes, in serial fashion, an attention portion comprising a 400-millisecond 1000-hertz tone, followed by a marker portion comprising an 8-millisecond 1000-hertz tone containing a single 180-degree phase shift, followed by a delay portion comprising a 200millisecond 1000-hertz tone.

6. The method as in claim 4 wherein the determining a correlation step comprises the steps of:
listening for the attention portion of the received synchronization sequence; and
upon hearing the attention portion, performing a correlation process on the received synchronization sequence and a correlation pattern to identify the marker portion thereof.

7. The method of claim 6 wherein the communication medium includes a digital coder, and wherein the correlation process produces a correlation value that is compared as against a minimum threshold, the method comprising the step of selecting the marker portion to be a relatively simple pattern that passes through the digital coder with relatively little distortion, and that results in a typical correlation value greater than the threshold.

8. The method of claim 7 wherein the marker portion comprises a single phase shift.

9. The method of claim 6 wherein performing the correlation process comprises the steps of:
repeatedly calculating a correlation value based on a temporally shifting sample of the received synchronization sequence and a correlation pattern;
detecting a peak correlation value from among the calculated correlation values; and
calculating the beginning point of the received measurement sample based on the peak correlation value.

10. The method of claim 9 wherein the repeatedly calculating step comprises repeatedly calculating the correlation value based on a temporally shifting sample of the received synchronization sequence and a correlation pattern comprising a copy of the marker portion of the transmitted synchronization sequence.

11. The method of claim 9 wherein the correlation pattern is stored in an n-unit pattern array, and wherein the repeatedly calculating a correlation value step comprises:
placing the sample in an n-unit input array;
performing the following function with the pattern array and input array to produce the correlation value:

$$CorrelationOutput = \sum_{i=1}^{n} (InputArray_i * PatternArray_i)^2.$$

12. The method of claim 9 wherein the detecting a peak correlation value step comprises detecting a peak correlation value from among the calculated correlation values, and deciding whether the peak correlation value exceeds a pre-determined threshold.

13. The method of claim 12 wherein if the peak correlation value does not exceed a pre-determined threshold, the receiving station sends to the transmitting station a retry signal, the transmitting station in response to the re-try signal re-transmitting the measurement sequence to the receiving station over the communications medium.

14. The method of claim 1 wherein the step of comparing comprises comparing the transmitted measurement sample and the received measurement sample according to Bark Spectral Distortion (BSD) techniques.

15. A method for determining a level of quality of a communications medium having an indeterminate delay, the communications medium communicatively coupling a transmitting station and a receiving station, the method comprising the steps of:
transmitting from the transmitting station over the communications medium a measurement sequence including a synchronization sequence followed by a measurement sample, the transmitted measurement sample having a predetermined beginning point, the transmitted synchronization sequence identifying the beginning point of the transmitted measurement sequence;
receiving by the receiving station over the communications medium the measurement sequence including the synchronization sequence followed by the measurement sample;
determining a correlation between the received synchronization sequence and a correlation pattern;
determining by the receiving station from the correlation the beginning point of the received measurement sample; and
comparing the transmitted measurement sample and the received measurement sample according to the respective beginning points to determine the level of quality of the communications medium.

16. The method of claim 15 wherein the transmitting step comprises transmitting from the transmitting station over the communications medium a measurement sequence including a synchronization sequence followed by a measurement sample having a human speech sample.

17. The method of claim 15 wherein the transmitting step comprises transmitting from a digital radiotelephone over a digital radiotelephone communications medium.

18. The method of claim 15 further comprising the step of clipping the received measurement sequence including the received synchronization sequence followed by the received measurement sample, wherein the clipping removes distortion.

19. The method of claim 15 wherein the transmitting step comprises transmitting from the transmitting station a synchronization sequence including, in serial fashion, an attention portion to obtain the attention of the receiving station, followed by a marker portion marking the beginning of a fixed-length delay portion, followed by the fixed-length delay portion, the end of the fixed-length delay portion being the beginning point of the transmitted measurement sample.

20. The method of claim 19 wherein the transmitting step comprises transmitting from the transmitting station a synchronization sequence includes, in serial fashion, an attention portion comprising a 400-millisecond 1000-hertz tone, followed by a marker portion comprising an 8-millisecond 1000-hertz tone containing a single 180-degree phase shift, followed by a delay portion comprising a 200-millisecond 1000-hertz tone.

21. The method as in claim 19 wherein the determining a correlation step comprises the steps of:

listening for the attention portion of the received synchronization sequence; and upon hearing the attention portion, performing a correlation process on the received synchronization sequence and the correlation pattern to identify the marker portion thereof.

22. The method of claim 21 wherein the communications medium includes a digital coder, and wherein the correlation process produces a correlation value that is compared as against a minimum threshold, the method comprising the step of selecting the marker portion to be a relatively simple pattern that passes through the digital coder with relatively little distortion, and that results in a typical correlation value greater than the threshold.

23. The method of claim 22 wherein the marker portion comprises a single phase shift.

24. The method of claim 21 wherein performing the correlation process comprises the steps of:

repeatedly calculating a correlation value based on a temporally shifting sample of the received synchronization sequence and the correlation pattern;

detecting a peak correlation value from among the calculated correlation values; and calculating the beginning point of the received measurement sample based on the peak correlation value.

25. The method of claim 24 wherein the repeatedly calculating step comprises repeatedly calculating the correlation value based on a temporally shifting sample of the received synchronization sequence and a correlation pattern comprising a copy of the marker portion of the transmitted synchronization sequence.

26. The method of claim 24 wherein the correlation pattern is stored in an n-unit pattern array, and wherein the repeatedly calculating a correlation value step comprises:

placing the sample in an n-unit input array;

performing the following function with the pattern array and input array to produce the correlation value:

$$CorrelationOutput = \sum_{i=1}^{n} (InputArray_i * PatternArray_i)^2.$$

27. The method of claim 24 wherein the detecting a peak correlation value step comprises detecting a peak correlation value from among the calculated correlation values, and deciding whether the peak correlation value exceeds a predetermined threshold.

28. The method of claim 27 wherein if the peak correlation value does not exceed a predetermined threshold, the receiving station sends to the transmitting station a retry signal, the transmitting station in response to the re-try signal retransmitting the measurement sequence to the receiving statation over the communications medium.

29. The method of claim 15 wherein the step of comparing comprises comparing the transmitted measurement sample and the received measurement sample according to Bark Spectral Distortion (BSD) techniques.

* * * * *